(12) United States Patent
Scherbel et al.

(10) Patent No.: US 10,091,291 B2
(45) Date of Patent: *Oct. 2, 2018

(54) SYNCHRONIZING A SOURCE, RESPONSE AND COMMENT PRESENTATION

(71) Applicant: SpeakWorks, Inc., Orem, UT (US)

(72) Inventors: Dallin M. Scherbel, Provo, UT (US); Kenneth L. Meyers, Orem, UT (US); Robert G. Taylor, Highland, UT (US)

(73) Assignee: SPEAKWORKS, INC., Orem, UT (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/409,935

(22) Filed: Jan. 19, 2017

(65) Prior Publication Data

US 2017/0134489 A1    May 11, 2017

Related U.S. Application Data

(63) Continuation-in-part of application No. 14/315,176, filed on Jun. 25, 2014, now Pat. No. 9,591,072.

(60) Provisional application No. 61/841,050, filed on Jun. 28, 2013.

(51) Int. Cl.
*H04L 29/08* (2006.01)
*H04L 29/06* (2006.01)

(52) U.S. Cl.
CPC ........ *H04L 67/1095* (2013.01); *H04L 65/601* (2013.01); *H04L 67/42* (2013.01)

(58) Field of Classification Search
CPC .... H04L 67/1095; H04L 65/601; H04L 67/42
See application file for complete search history.

(56) References Cited

U.S. PATENT DOCUMENTS

| | | | | |
|---|---|---|---|---|
| 5,986,717 | A * | 11/1999 | Fairhurst | H04N 5/272 348/579 |
| 7,623,755 | B2 † | 11/2009 | Kuspa | |
| RE44,918 | E * | 5/2014 | Deng | 709/231 |
| 9,591,072 | B2 * | 3/2017 | Scherbel | H04L 67/1095 |
| 2002/0003948 | A1 * | 1/2002 | Himeno | H04N 9/7921 386/208 |
| 2004/0001106 | A1 * | 1/2004 | Deutscher | G06F 17/30017 715/838 |
| 2004/0061794 | A1 * | 4/2004 | Bodin | G11B 27/032 348/231.99 |
| 2005/0081159 | A1 † | 4/2005 | Gupta | |
| 2005/0268180 | A1 * | 12/2005 | Sakagami | G11B 20/1426 714/701 |
| 2005/0276282 | A1 * | 12/2005 | Wells | H04N 7/56 370/503 |
| 2007/0074116 | A1 † | 3/2007 | Thomas | |
| 2009/0164904 | A1 † | 6/2009 | Horowitz | |
| 2009/0232129 | A1 * | 9/2009 | Wong | H04M 7/0024 370/352 |
| 2010/0153850 | A1 † | 6/2010 | Hariton | |
| 2010/0281384 | A1 † | 11/2010 | Lyons | |
| 2011/0026898 | A1 † | 2/2011 | Lussier | |

(Continued)

*Primary Examiner* — Uzma Alam
(74) *Attorney, Agent, or Firm* — Kunzler, PC

(57) ABSTRACT

For displaying a source presentation with accompanying timed responses and comments, a synchronization module synchronizes client time codes with a host time code as a medium module records responses and comments on the source presentation.

19 Claims, 13 Drawing Sheets

(56) References Cited

U.S. PATENT DOCUMENTS

| | | | |
|---|---|---|---|
| 2011/0125709 A1* | 5/2011 | Pandya | G06F 17/30575 707/610 |
| 2012/0036423 A1† | 2/2012 | Haynes, II | |
| 2012/0151345 A1* | 6/2012 | McClements, IV | G06Q 10/101 715/716 |
| 2012/0236201 A1* | 9/2012 | Larsen | G06Q 10/10 348/468 |
| 2012/0240179 A1* | 9/2012 | Watanabe | H04N 21/2743 725/145 |
| 2012/0311644 A1* | 12/2012 | Sato | H04N 21/4307 725/74 |
| 2013/0103814 A1* | 4/2013 | Carrasco | H04L 65/4015 709/223 |
| 2014/0187334 A1* | 7/2014 | Crossley | A63F 13/44 463/43 |
| 2014/0215535 A1* | 7/2014 | Elliott | H04N 21/2387 725/81 |
| 2015/0006759 A1 | 1/2015 | Scherbel et al. | |

\* cited by examiner
† cited by third party

SYNCHRONIZING A SOURCE, RESPONSE AND COMMENT PRESENTATION

CROSS-REFERENCE TO RELATED APPLICATIONS

This application is a continuation-in-part that claims priority to U.S. patent application Ser. No. 14/315,176 entitle "PRESENTING A SOURCE MEDIUM" and filed on Jun. 25, 2014 for Dallin M. Scherbell, which is incorporated herein by reference, which claims priority to U.S. Provisional Patent Application No. 61/841,050 entitled "PRESENTING A SOURCE MEDIUM" and filed on Jun. 28, 2013 for Dallin Scherbell, which is incorporated herein by reference.

BACKGROUND

Field

The subject matter disclosed herein relates synchronizing a source, response, and comment presentation.

Description of the Related Art

A response and/or comment may be recorded to accompany a source presentation such as a language instruction presentation.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
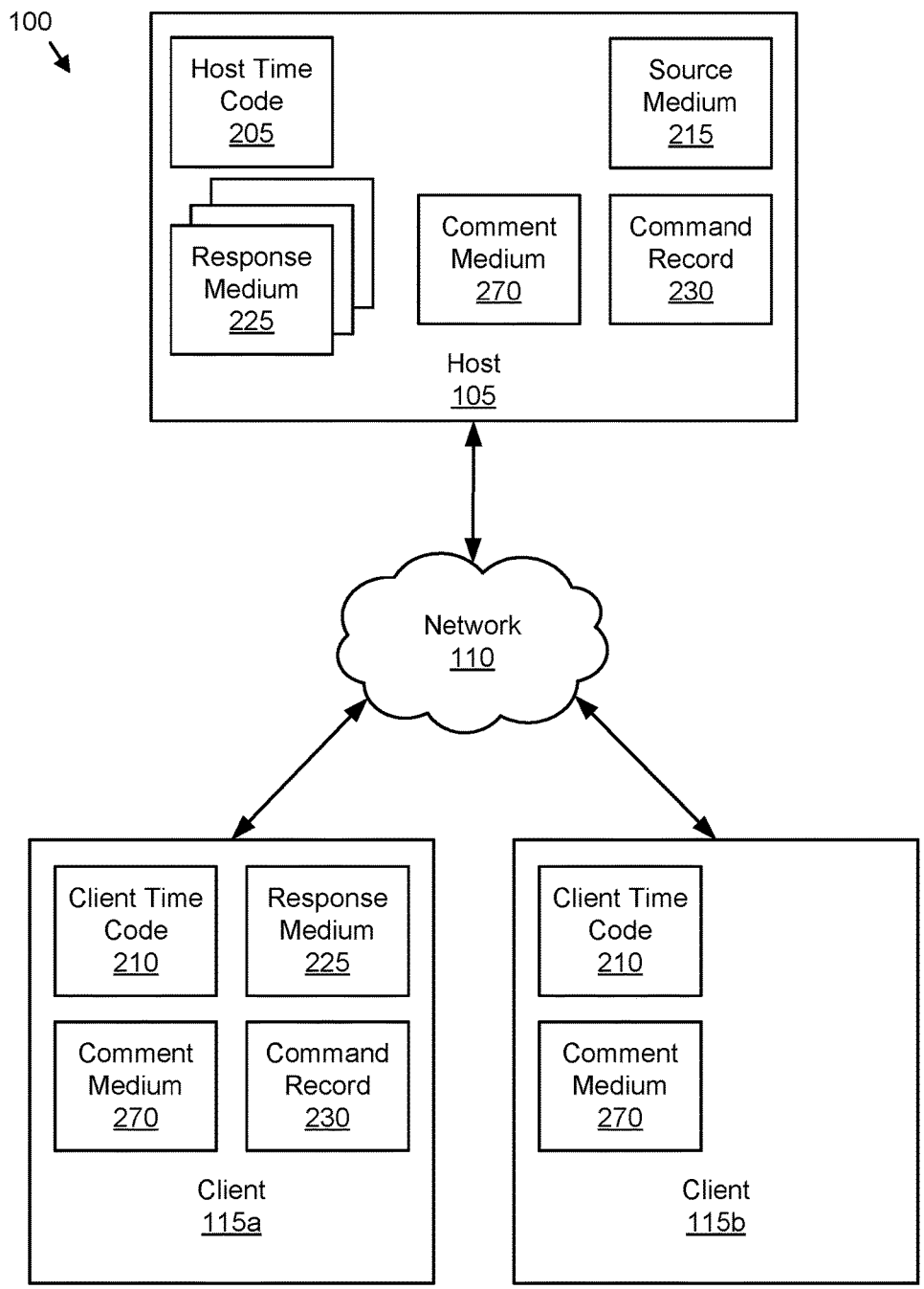
FIG. 1 is a schematic block diagram illustrating one embodiment of a presentation system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more non-transitory computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Python, Ruby, Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIG. 1 is a schematic block diagram illustrating one embodiment of a presentation system 100. The system 100 includes a host 105 and one or more clients 115. The host 105 and the clients 115 are in communication through a network 110. The network 110 may be the Internet, a wide-area network, a local area network, a Wi-Fi network, a mobile telephone network, an ad hoc network, or combinations thereof.

The host 105 may present a source presentation stored on a source medium 215 to one or more clients 115. In one embodiment, the source presentation is streamed over the network 110. Alternatively, a copy of the source presentation may be copied to the one or more clients 115. In a certain embodiment, the source presentation is presented in a browser. The source presentation may be a video. Alternatively, the source presentation may be an audio message. In addition, the source presentation may be one or more of a live presentation, text, a document, and an illustration. In one embodiment, the source presentation comprises language instruction. In a certain embodiment, the source presentation is a live presentation in video, audio, text, illustration, a document or combinations thereof.

During the presentation of the source presentation, the client 115 may control the presentation of the source presentation with one or more commands. The commands may be issued at the client 115. In one embodiment, the commands are issued in response to user activating a control. For example, the user may activate one or more of a pause control, a play control, a reverse control, and/or a fast-forward control.

For example, a user at a client 115 may view a language instruction source presentation. During the source presentation, the user may be requested to respond to the source presentation. For example, the user may be requested to answer question and/or to make a statement in a target language.

The client 115 may record one or more responses and/or comments to the source presentation. The response may be recorded to one or more response medium 225. The response may be expected subsequent to a portion of the source presentation. In one embodiment, the one or more response medium 225 resides on the client 115. Alternatively, the one or more response medium 225 resides in the host 105. The recorded response may be a video. The recorded response may also be audio, text, a document, an illustration, or the like. The document may be a Portable Document Format (PDF) document, a word processor document, a presentation document, a spreadsheet document, or the like. The illustration may be a still image, a drawn image, and/or a still image. In one embodiment, the recorded response may be a combination of one or more of a video, audio, text, document, and illustration.

One or more recorded response on the response medium 225 may be later played back along with the source presentation. The user at a client 115 may view and/or listen to the recorded response and the source presentation. In addition, other users at other clients 115 may also receive to the recorded response with the source presentation. The other users may record comments on the comment medium 270. The comments may be video, audio, text, a document, an illustration, or combinations thereof.

In one embodiment, the source presentation along with the comment response and/or recorded response from the comment medium 270 and/or the response medium 225 may be played back together. The presentation of the source presentation with the comment response and/or recorded response is more effective and useful if the comments and/or recorded response are properly synchronized with the source presentation.

The host 105 includes a host time code 205. In one embodiment, the host time code 205 is an absolute time. Alternatively, the host time code 205 may indicate time elapsed from an event such as a beginning of the presentation of the source presentation. The host time code 205 may be generated by a clock. In addition, each client includes a client time code 210. The client time code 210 may be an absolute time. Alternatively, the client time code 210 may indicate a time elapsed from an event such as the beginning of the source presentation and/or the beginning of a response. The client time code 210 may be generated by a clock.

A command record 230 is also shown. The command record 230 may reside on the host 105, the client 115, or combinations thereof. The comment medium 270 may also reside on the host 105, the client 115, and combinations thereof. The command record 230 and the comment medium 270 will be described in more detail hereafter.

In the past, when the source presentation and the recorded response are later presented together, the recorded response could be out of synchronization with the source presentation because the commands controlling the presentation of the source presentation are not incorporated in the presentation. For example, a user may pause the presentation of the source presentation while recording a response, so that the recorded response is relevant to the instant when the presentation was paused, and not a longer time interval equal to a length of the recorded response.

In addition, the recorded response may be out of synchronization with the source presentation because of differences between the host time code 205 and the client time code 210. For example, a clock generating the client time code 210 used with recording the recorded response and/or comment response may steadily lose time or gain time. In addition, a clock generating the host time code 205 used when presenting the source presentation may also steadily lose or gain time. As a result, the client time code 210 may diverge from the host time code 205 over the presentation of the source presentation. Therefore, time codes of the recorded response may be out of synchronization with the time codes of the source presentation. When the recorded response is played back along with the source presentation, the recorded response may be out of synchronization with the source presentation.

When the recorded response is played back with the source presentation and the comment responses, the comment responses may be out of synchronization with the source presentation because of the differences between the host time code 205 and the client time code 210. As a result, time codes of the comment response may be out of synchronization with the time codes of the source presentation so that when the comment response is played back along with the source presentation and/or the recorded response, the comments will be out of synchronization with the source presentation.

The embodiments described herein present the source presentation modified by the commands and concurrently present the recorded response synchronized to the host time code. In addition, the embodiments synchronize the host time code 205 with the client time code 210. As a result, the recorded response and/or the comment response may be presented along with the source presentation with the same temporal relationships as originally recorded at the clients 115.

Figure 2A:
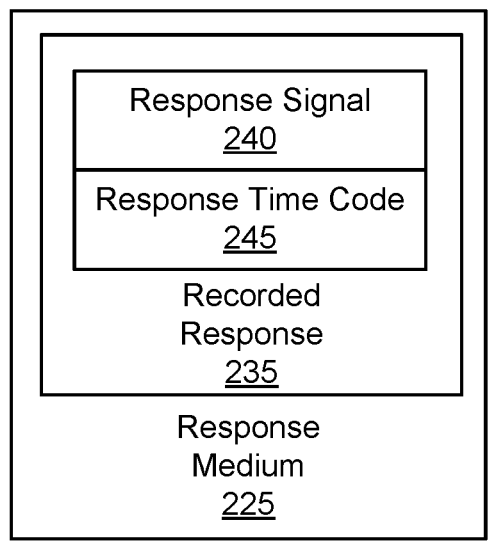
FIG. 2A is a schematic block diagram illustrating one embodiment of a response medium.

FIG. 2A is a schematic block diagram illustrating one embodiment of a response medium 225. The response medium 225 may be a semiconductor memory, a hard disk drive, an optical storage device, a micromechanical storage device, or combinations thereof. The recorded response 235 may be recorded to the response medium 225. The recorded response 235 includes a response signal 240 and a response time code 245.

The response signal 240 may be a digital signal, an analog signal, or combinations thereof. The response signal 240 may record video, audio, text, a document, an illustration, or combinations thereof. The response time code 245 may indicate when portions of the response signal 240 are recorded. In one embodiment, each discrete portion of the response signal 240 includes a response time code 245. Alternatively, the response time code 245 may indicate a time selected portions of the response signal 240 are recorded. For example, the response time code 245 may demark a beginning of the response signal 240.

In one embodiment, the response time code 245 is recorded from the client time code 210. The client time code 210 may be synchronized to the host time code 205 and thus synchronize the response time code 245 to the host time code 205 as will be described thereafter. Alternatively, the response time code 245 may be recorded directly from the host time code 205.

Figure 2B:
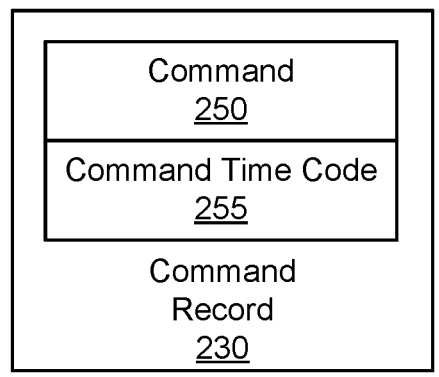
FIG. 2B is a schematic block diagram illustrating one embodiment of a command record.

FIG. 2B is a schematic block diagram illustrating one embodiment of the command record 230. The command record 230 may be stored on a memory such as a semiconductor memory, a hard disk drive, an optical storage device, a micromechanical storage device, or combinations thereof. The command record 230 may record the commands controlling the presentation of the source presentation at the client 115. The command record 230 may reside on the client 115. Alternatively, the command record 230 may reside on the host 105.

The command record 230 includes a command 250 and a command time code 255. The command 250 may be a play command, a pause command, the stop command, a reverse command, a fast-forward command, or the like. The command time code 255 may record a time code corresponding to the source presentation at the execution of the command 250. The command time code 255 may be recorded from the host time code 205 and thus synchronized to the host time code 205. Alternatively, the command time code 255 may be recorded from the client time code 210, with the client time code 210 synchronized to the host time code 205. Thus, the command time code 255 is also synchronized to the host time code 205.

Figure 2C:
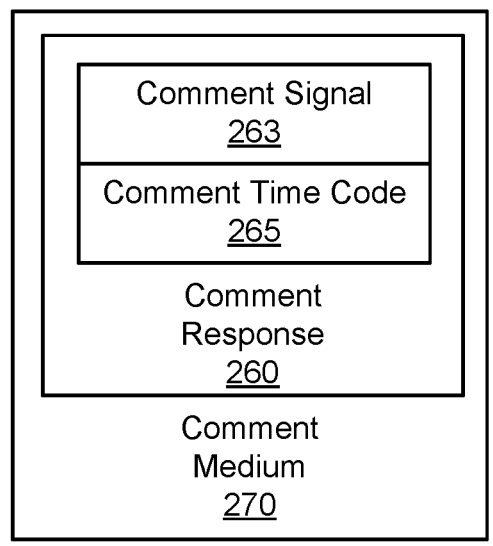
FIG. 2C is a schematic block diagram illustrating one embodiment of a comment medium.

FIG. 2C is a schematic block diagram illustrating one embodiment of the comment medium 270. The comment medium 270 may be a semiconductor memory, a hard disk drive, an optical storage device, a micromechanical storage device, or combinations thereof. The comment medium 270 records a comment response 260. In one embodiment, the comment response 260 is not expected from the user but may be offered. The comment 260 includes a comment signal 263 and a comment time code 265. In one embodiment, the comment 260 may be created at a second client 115b. For example, an observer may view a presentation of the source presentation and the recorded response 235 and create the comment 260 in response to both the source presentation and the recorded response 235. The comment response 260 may be a video, audio, text, a document, an illustration, or combinations thereof.

The comment time code 265 may be recorded with the comment signal 263. In one embodiment, the comment time code 265 is synchronized to the host time code 205. The comment time code 265 may be recorded directly from the host time code 205. Alternatively, the comment time code 265 may be recorded from a client time code 210, with the client time code 210 synchronized to the host time code 205.

Figure 2D:
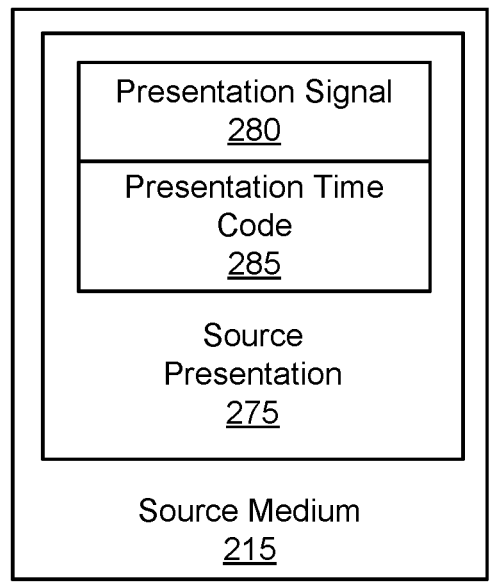
FIG. 2D is a schematic block diagram illustrating one embodiment of a source medium.

FIG. 2D is a schematic block diagram illustrating one embodiment of the source medium 215. The source medium 215 may be a semiconductor memory, a hard disk drive, an optical storage device, a micromechanical storage device, or combinations thereof. The source medium 215 stores the source presentation 275. The source presentation 275 may be organized as a presentation signal 280 with one or more presentation time codes 285. The presentation time codes 285 may be explicitly recorded as part of the source presentation 275. For example, presentation time codes 285 may regularly be embedded as part of the presentation signal 280. Alternatively, the presentation time codes 285 may be an implicit part of the source presentation 275.

Figure 3A:
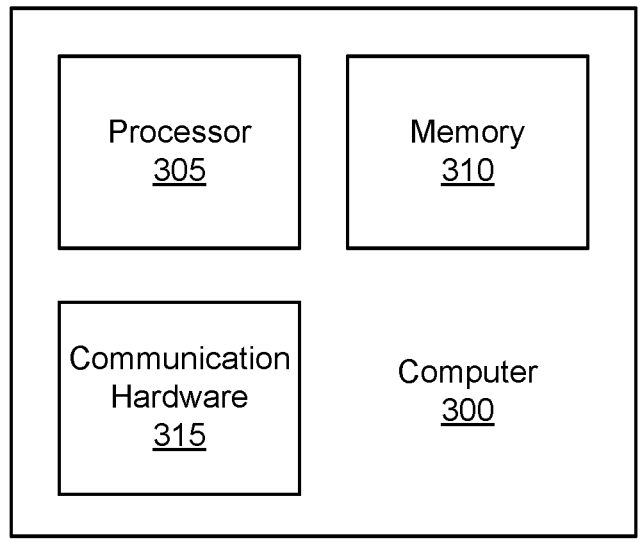
FIG. 3A is a schematic block diagram illustrating one embodiment of a computer.

FIG. 3A is a schematic block diagram illustrating one embodiment of a computer 300. The computer 300 may be embodied in the host 105, the client 115, or combinations thereof. The computer 300 includes a processor 305, a memory 310, and communication hardware 315. The memory 310 may be a computer readable storage medium such as a semiconductor storage device, a hard disk drive, an optical storage device a micromechanical storage device, or combinations thereof. The memory 310 may store program code. The processor 305 may execute the program code. The communication hardware 315 may communicate with other devices.

In one embodiment, the memory 310 embodies one or more of the source medium 215, the content medium 270, the command record 230, and/or the response medium 225.

Figure 3B:
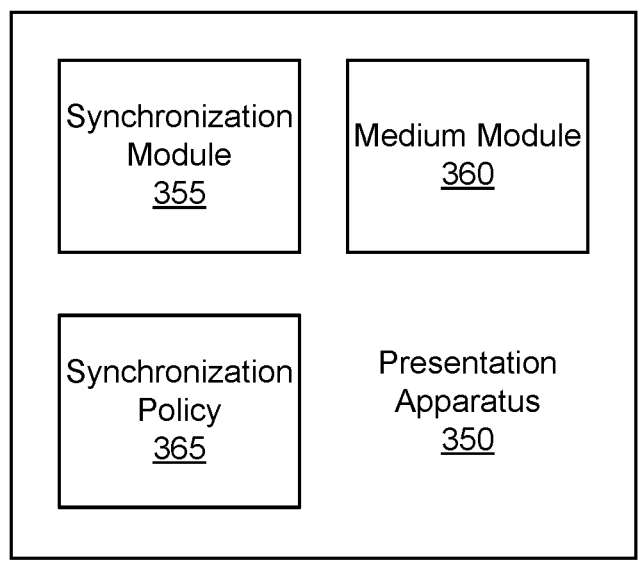
FIG. 3B is a schematic block diagram illustrating one embodiment of a presentation apparatus.

FIG. 3B is a schematic block diagram illustrating one embodiment of a presentation apparatus 350. The apparatus 350 may be embodied in the computer 300. In the depicted embodiment, the apparatus 350 includes a synchronization module 355 and a medium module 360. The synchronization module 355 and the medium module 360 may be embodied in a computer readable storage medium such as the memory 310. The computer readable storage media may store program code executable by the processor 305 perform the functions of the synchronization module 355 and the medium module 360.

The synchronization module 355 may synchronize the client time code 210 with the host time code 205. The medium module 360 may record a response to the presentation of the source presentation 275 at the client 115, with the recorded response 235 synchronized to the host time code 205. The apparatus 350 may also include a synchronization policy 365 as will be described hereafter.

Figure 4A:
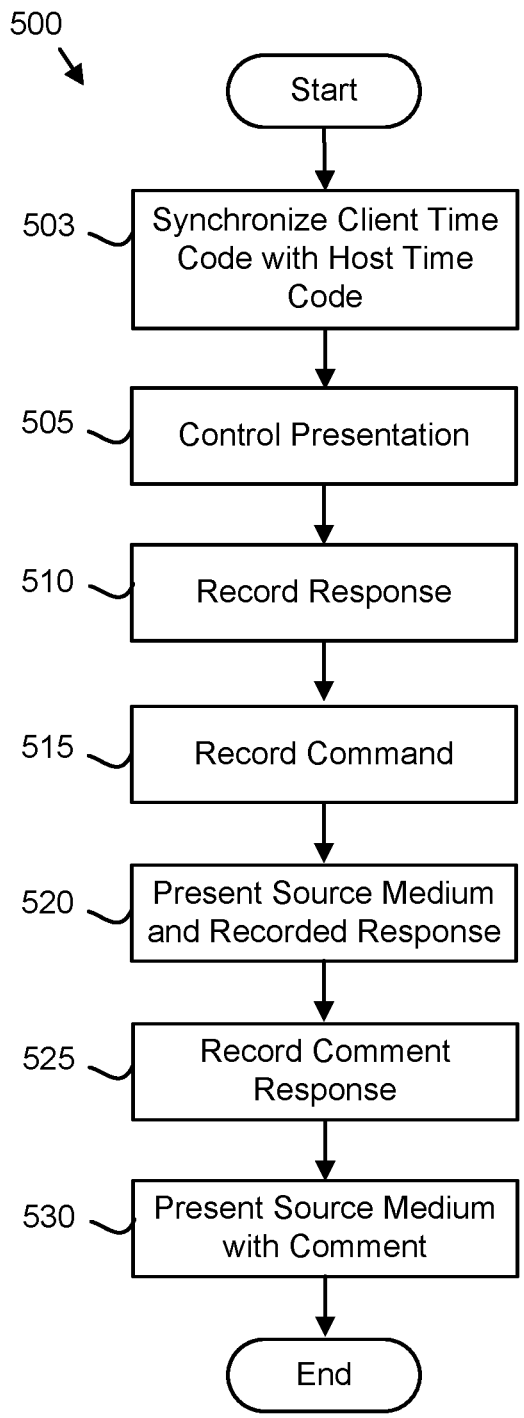
FIG. 4A is a schematic flow chart diagram illustrating one embodiment of a recording method.

FIG. 4A is a schematic flow chart diagram illustrating one embodiment of a recording method 500. The method 500 may be performed by the processor 305. Alternatively, the method 500 may be performed by a computer readable storage medium such as the memory 310. The computer readable storage medium may store program code. The program code may be executed by the processor 305 to perform the functions of the method 500.

The method 500 starts and the synchronization module 355 may synchronize 503 the client time code 210 with the host time code 205. The synchronization 503 of the client time code 210 with the host time code 205 is described in more detail in FIG. 4B.

The medium module 360 may control 505 presentation of the source presentation 275 from the host 105 in response to at least one command at the client 115. For example, a user may initiate a play command 250a at the client 115 to begin presentation of the source presentation 275. In addition, the user may initiate a pause command at the client 115 to pause presentation of the source presentation 275. In one embodiment, the presentation of the source presentation 275 as modified by the at least one command is synchronized to the host time code 205.

The medium module 360 further records 510 the recorded response 235 to the presentation of the source presentation 275 at the client 115. For example, the source presentation 275 may be language instruction and the recorded response 235 may be a language exercise directed the language instruction, such as an answer to a question in the language instruction, or the like.

In one embodiment, the response signal 240 is recorded with one or more response time codes 245. The response time codes 245 may be recorded from the host time code 205 received at the client 115. Thus, the recording of the recorded response 235 at the client 115 is directly synchronized to the host time code 205. Alternatively, the response time codes 245 may be recorded from the client time code 210 after the client time code 210 is synchronized with the host time code 205.

In one embodiment, a single response time code 245 indicates one of the start of the response signal 240, an end of the response signal 240, or a specified location within the response signal 240 such as 10 milliseconds into the response signal 240. Alternatively, to response time codes 245 may indicate the start and the end of the response signal 240 respectively. In a certain embodiment, one or more response time codes 245 are distributed throughout the response signal 240. The one or more response time codes 245 may be distributed regularly throughout the response signal 240.

The response may be recorded 510 as the recorded response 235 on the response medium 225. In one embodiment, the recorded response 235 is recorded on a response medium 225 on the client 115 and copied to a response medium 225 on the host 105.

The medium module 360 may record 515 at least one command 250 synchronized to the host time code 205. In one embodiment, the host time code 205 is used to record the command time code 255. Alternatively, the client time code 210 synchronized to the host time code 205 is used to record the command time code 255. The command 250 and the command time code 255 may be recorded as an entry in the command record 230 as will be shown hereafter in FIG. 5E.

The method 500 may present 520 the source presentation 275 modified by the at least one command 250 and concurrently present 520 the recorded response 235. For example, the source presentation 275 may be paused by a pause command 250 at a time indicated by the command time code 255. In addition, the method 500 may present the recorded response 235 and then play the source presentation 275 as described hereafter in FIG. 5F.

Alternatively, a language instruction source presentation 275 may be presented 520 and paused at a same time during the presentation as when a first user original paused the presentation to record the recorded response 235. The recorded response 235 may be concurrently presented 520 with the paused source presentation 275 and then the source presentation played as shown in FIG. 5G. Thus, the source presentation 275 and recorded response 235 are presented as originally recorded, without changes due to time codes from unsynchronized sources.

The method 500 may present 520 the source presentation 275 modified by the at least one command 250 and concurrently present 520 the recorded response 235 via one or more clients 115. The one or more clients 115 may include a client 115 that recorded 510 the recorded response 235. Alternatively, the one or more clients 115 may not include the client 115 that recorded 510 the recorded response 235.

The method 500 may record 525 a comment response 260. The comment response 260 may be recorded 525 during the presentation 520 of the source presentation 275 and the recorded response 235 as described in step 520. The comment response 260 may be synchronized to the host time code 205. In one embodiment, the comment time code 265 is recorded directly from the host time code 205. Alternatively, the comment time code 265 is recorded from a client time code 210, with the client time code 210 synchronized to the host time code 205.

The comment response 260 may be a response to the presentation of the source presentation 275 and the concurrent presentation of the recorded response 235. For example, a second user may view the presentation of the source presentation 275 and the recorded response 235 and record 525 the comment response 260.

The method 500 may further concurrently present 530 the comment 260 with at least one of the presentation of the source presentation 275 and the presentation of the recorded response 235 and the method 500 ends. The presentation 530 of the comment 260 may be synchronized with the host time code 205. Thus, the user that originally recorded the recorded response 235 may view the presentation of the source presentation 275, the recorded response 235, and all comment responses 260, with each synchronized to the host time code 205.

Figure 4B:
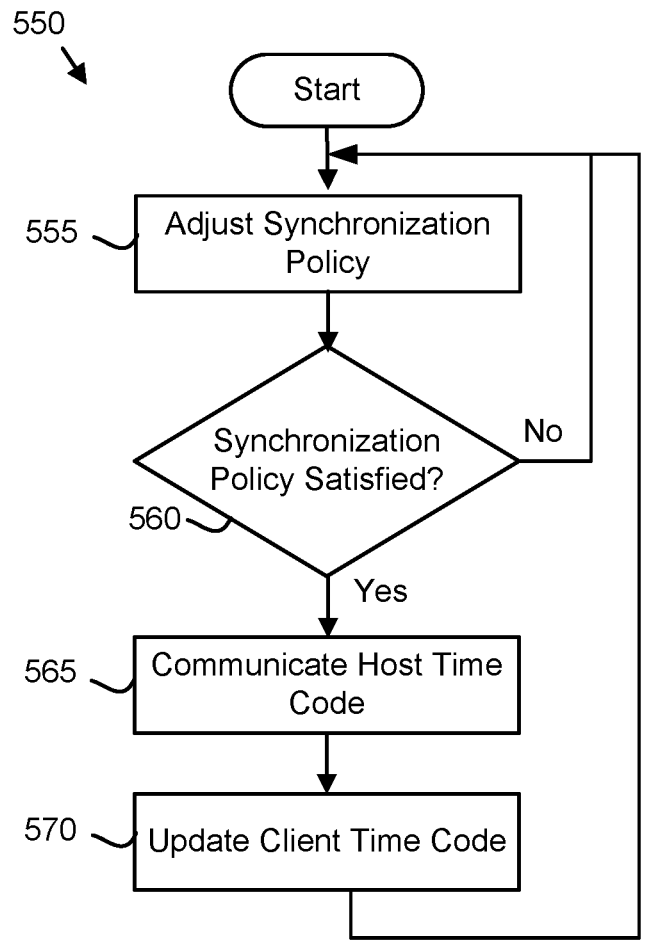
FIG. 4B is a schematic flow chart diagram illustrating one embodiment of a synchronization method.

FIG. 4B is a schematic flow chart diagram illustrating one embodiment of a recording method 550. The method 550 may be performed by the processor 305. Alternatively, the method 550 may be performed by a computer readable storage medium such as the memory 310. The computer readable storage medium may store program code. The program code may be executed by the processor 305 to perform the functions of the method 550.

The method 550 starts, and in one embodiment, the synchronization module 355 adjusts 555 a synchronization policy 365. The synchronization policy 365 may be stored in the memory 310. The synchronization policy may specify when and how the host time code 205 is communicated to the client 115 to update the client time code 210.

In one embodiment, the synchronization policy 365 specifies that the host time code 205 is embedded in the source presentation 275 as will be described hereafter in FIG. 5A. Alternatively, the synchronization policy may specify that the host time code 205 is communicated to the client 115 separately from the source presentation 275 as will be described hereafter in FIG. 5B. In one embodiment, the synchronization policy specifies at the host time code 205 is communicated to the client 115 in response to a time code request as will be described hereafter in FIG. 5C.

The synchronization module 355 may adjust 555 the synchronization policy 365 in response to a communication delay between the host 105 and the client 115. For example, the synchronization policy may specify more frequent synchronization of the client time code 210 to the host time code 205 as a function of the communication delay as illustrated in Equation 1, where SD is a synchronization time interval between synchronizations, CD is the communication delay, k1 is a nonzero constant.

$$SD = k*CD \qquad \text{Equation 1}$$

Alternatively, the synchronization policy 365 may specify that the client time code 210 be synchronized to the host time code 205 in response to a time code request.

In one embodiment, the synchronization policy may specify that the host time code 205 is embedded in the source presentation 275. In an alternative embodiment, the synchronization policy may specify the host time code 205 is communicated separately from the source presentation 275. In one embodiment, the synchronization policy may specify a separate communication port to receive the host time code 205.

The synchronization module 355 may further determine 560 if the synchronization policy 365 is satisfied. In one embodiment, the synchronization policy 365 is satisfied after the expiration of the synchronization time interval. In addition, the synchronization policy may be satisfied in response to receiving the time code request. If the synchronization policy 365 is not satisfied, the synchronization module 355 continues to adjust 555 the synchronization policy 365.

If the synchronization policy 365 is satisfied, the synchronization module 355 may communicate 565 the host time code 205 from the host 105 to the client 115. The synchronization module 355 may further update 570 the client time code 210 with the host time code 205. In one embodiment, the synchronization module 355 adds the communication delay to the host time code 205 to generate the client time code 210. The method 550 may loop to adjust 555 the synchronization policy.

In one embodiment, the communication delay is added to the host time code 205 at the client 115 to generate the client time code 210. The communication delay may be the time required to transmit the host time code 205 from the host 105 to the client 115. The communication delay may be determined from a one-way message and/or a round-trip message between the host 105 and the client 115.

Figure 5A:
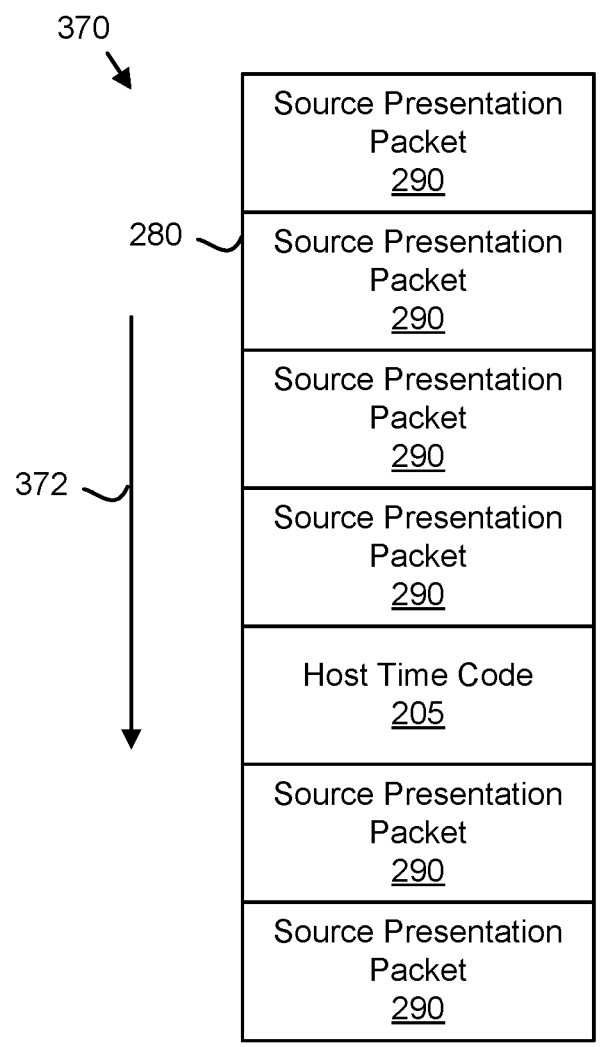
FIG. 5A is a schematic block diagram illustrating one embodiment of communicating a host time code.

FIG. 5A is a schematic block diagram illustrating one embodiment of communicating 370 the host time code 205. In the depicted embodiment, the presentation signal 280 includes a plurality of source presentation packets 290 sequentially over time 372. The host time code 205 may be embedded in the presentation signal 280 as the presentation time code 285. In one embodiment, the client 115 may parse the host time code 205 from the presentation signal 280 and update the client time code 210 with the host time code 205.

Figure 5B:
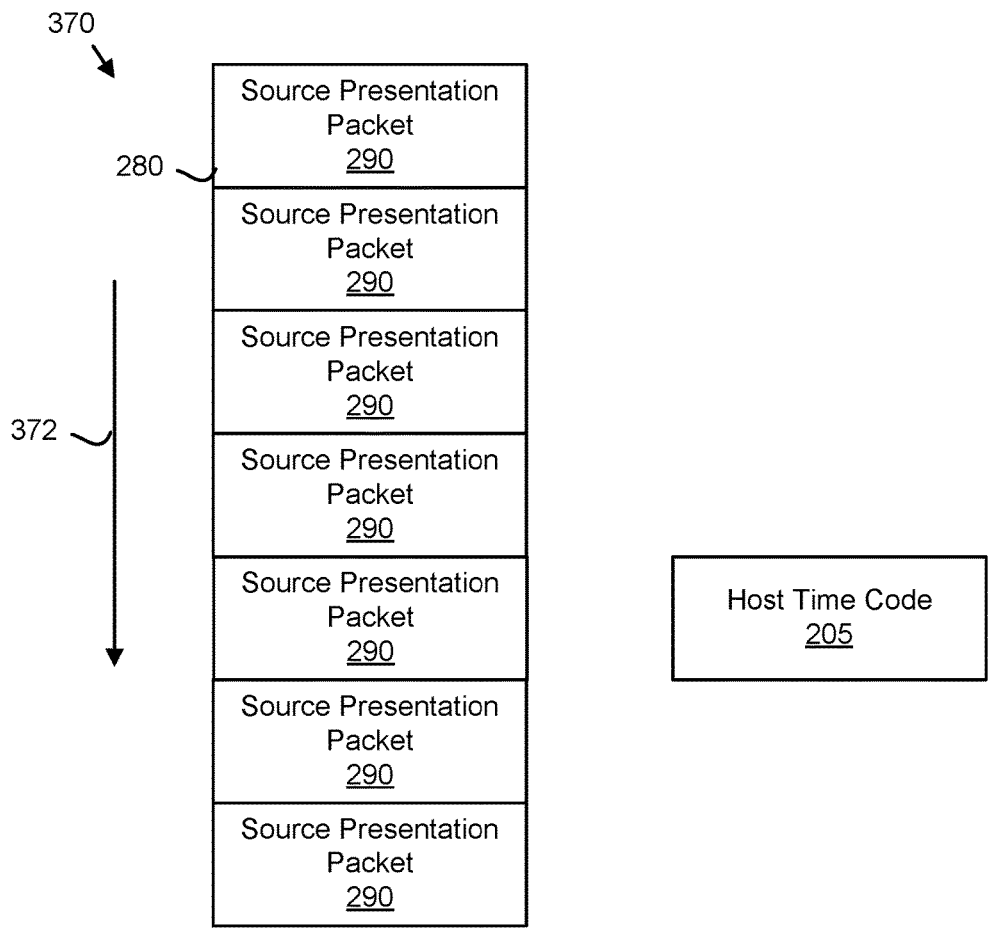
FIG. 5B is a schematic block diagram illustrating one alternate embodiment of communicating a host time code.

FIG. 5B is a schematic block diagram illustrating one alternate embodiment of communicating 370 the host time code 205. In the depicted embodiment, the presentation signal 280 is communicated sequentially over time through source presentation packets 290. The presentation signal 280 may be communicated to a first communication port. The host time code 205 as the presentation time code 285 may be communicated separately to a second communication port.

Figure 5C:
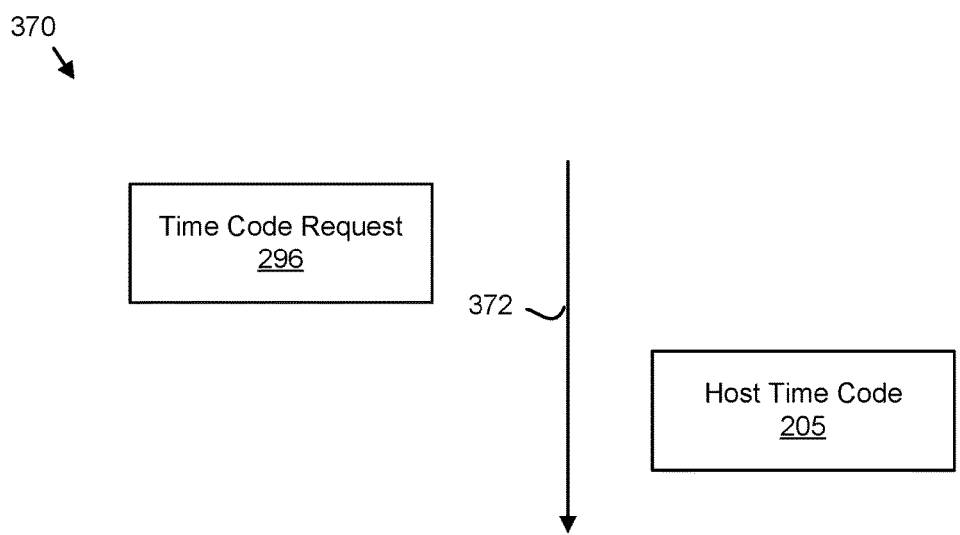
FIG. 5C is a schematic block diagram illustrating one alternate embodiment of communicating a host time code.

FIG. 5C is a schematic block diagram illustrating one alternate embodiment of communicating 370 the host time code 205. In the depicted embodiment, the time code request 296 is communicated from the client 115 to the host 105. The host may respond to the time code request 296 by communicating the host time code 205 to the client 115.

Figure 5D:
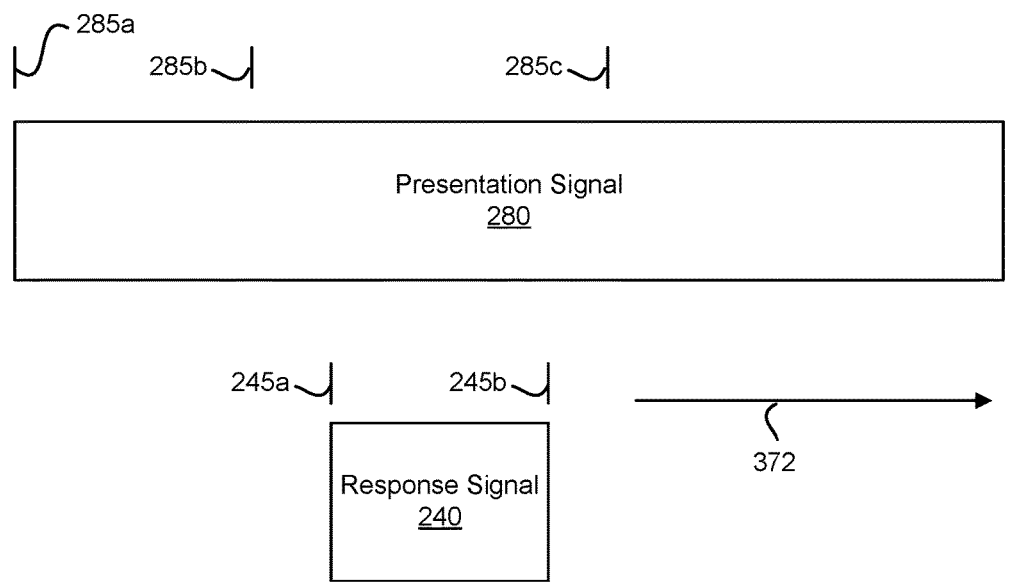
FIG. 5D is a schematic block diagram illustrating one embodiment of controlling a presentation of a source presentation.

FIG. 5D is a schematic block diagram illustrating one embodiment of controlling the presentation of the source presentation 275. In the depicted embodiment, the presentation signal 280 is communicated over time 372. A play command 250a may be received at the client 115 at a first presentation time code 285a. The play command 250a and a first command time code 255a equal to the first presentation time code 285a may be recorded as an entry 233a in the command record 230 has shown in FIG. 5E. The play command 250a may cause the client 115 to present the presentation signal 280. All the presentation time codes 285 may be synchronized to the host time code 205.

A pause command 250b may be received of the client 115 at a second presentation time code 285b. The pause command 250b and a second command time code 255b may be recorded as an entry 233b in the command record 230 of FIG. 5E. The second command time code 255b may be equal to the second presentation time code 285b. The client 115 may receive a response signal 240 at a first response time code 245a synchronized to the host time code 205. The response signal 240 may terminate at a second response time code 245b synchronized to the host time code 205.

After recording the response signal 240, the client 115 may receive a play command 250c at a third presentation time code 285c. The play command 250c and a third command time code 255b may be stored as an entry 233c in the command record 230. The third command time code 255c may be equal to the third presentation time code 285.

Figure 5E:
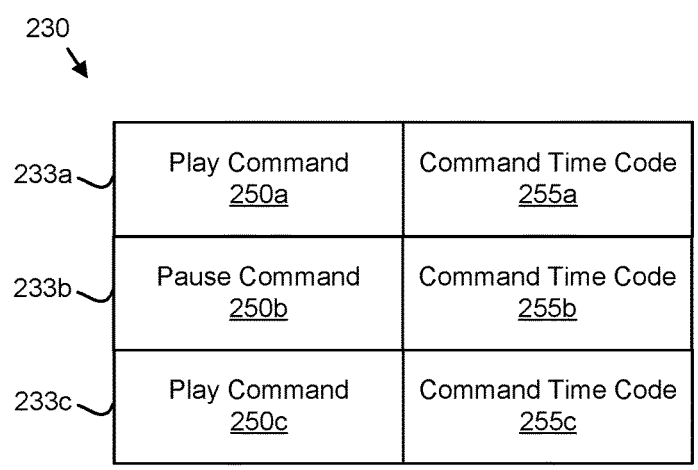
FIG. 5E is a schematic block diagram illustrating one embodiment of a command record.

FIG. 5E is a schematic block diagram illustrating one embodiment of the command record 230, with the commands 250 and command time codes 255 recorded as entries 233 in response to the presentation of the source presentation 275 as described for FIG. 5D.

Figure 5F:
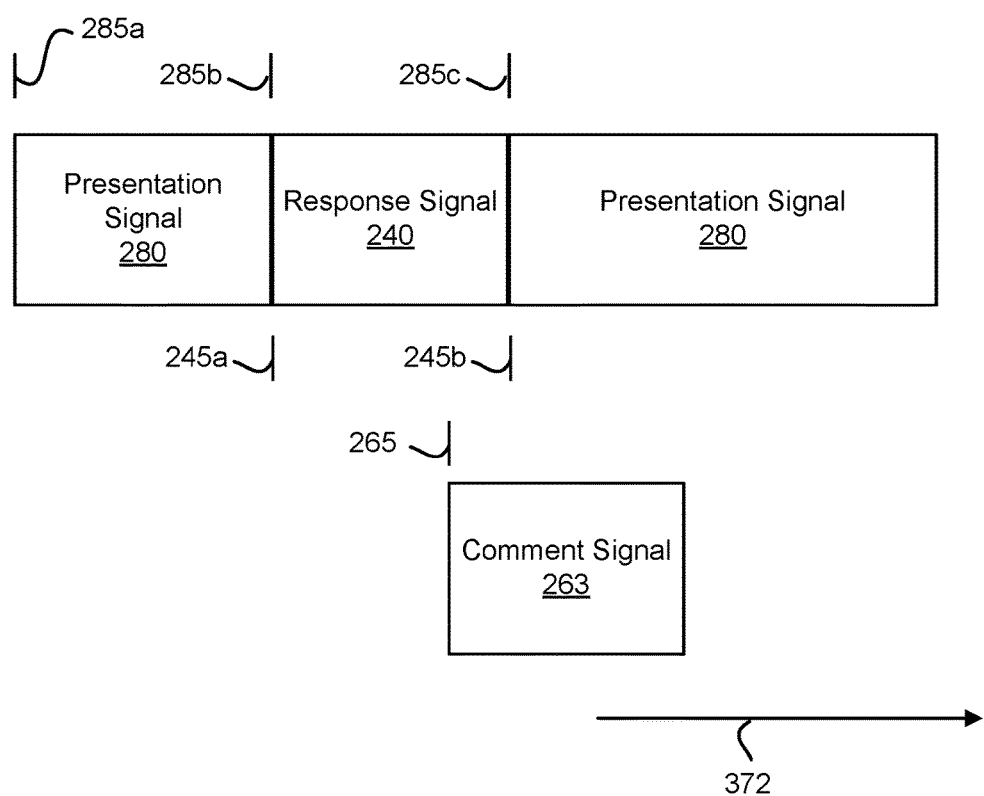
FIG. 5F is a schematic block diagram illustrating one embodiment of presenting a source presentation and a recorded response.
Figure 5G:
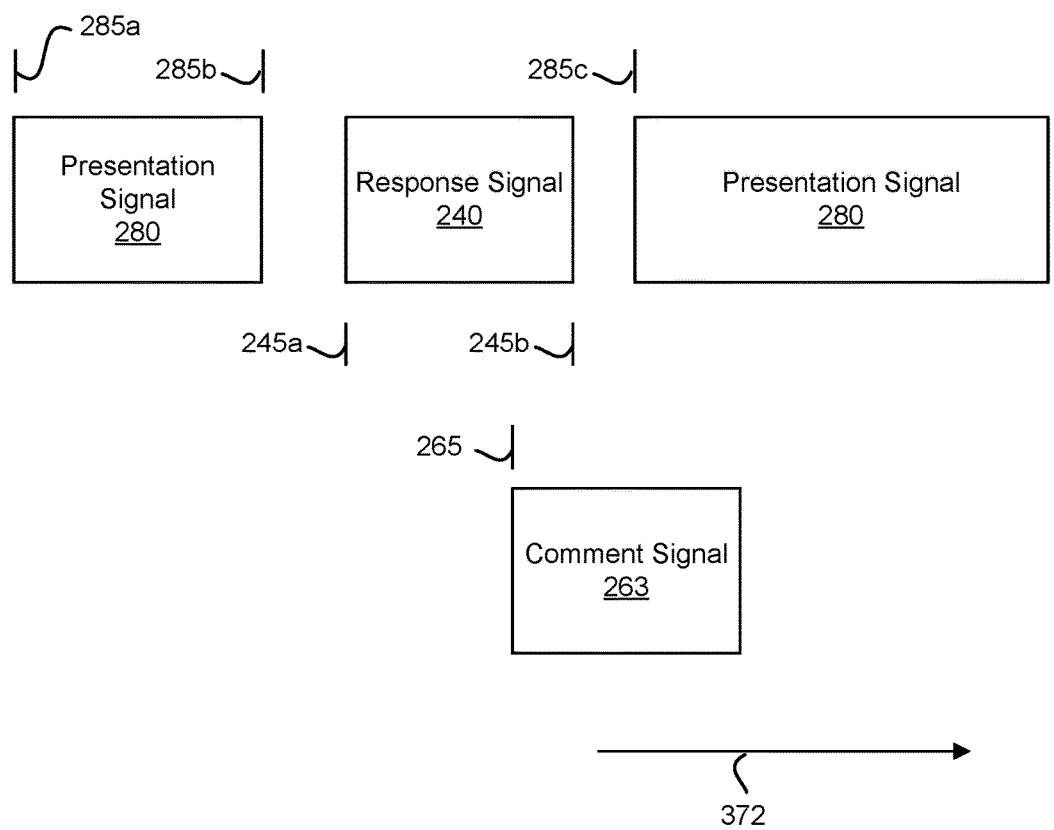
FIG. 5G is a schematic block diagram illustrating one alternate embodiment of presenting a source presentation and a recorded response.

FIG. 5F is a schematic block diagram illustrating one embodiment of presenting the source presentation 275 and the response signal 240 of FIG. 5D. In the depicted embodiment, the first response time code 245a is set equal to the second presentation time code 285b and the third presentation time code 285c is set equal to the second response time code 245b. As a result, the presentation signal 280 and the response signal 240 are presented as a contiguous signal. In one embodiment, the source presentation 275 and the response signal 240 are presented as a contiguous signal to one or more clients 115.

A comment signal 263 may be recorded at a comment time code 265 during the presentation of the source presentation 275 and the response signal 240. The comment signal 263 may later be presented with the source presentation 275 and the response signal 240 beginning at the comment time code 265.

FIG. 5G is a schematic block diagram illustrating one alternate embodiment of presenting the source presentation 275 and the response signal 240 of FIG. 5D. In the depicted embodiment, the presentation signal 280 and the response signal 240 are presented with the original timing based on the host time code 205 as shown in FIG. 5D.

A comment signal 263 may be recorded at a comment time code 265 during the presentation of the source presentation 275 and the response signal 240. The comment signal 263 may later be presented with the source presentation 275 and the response signal 240 beginning at the comment time code 265 as shown in FIG. 5H.

Figure 5H:
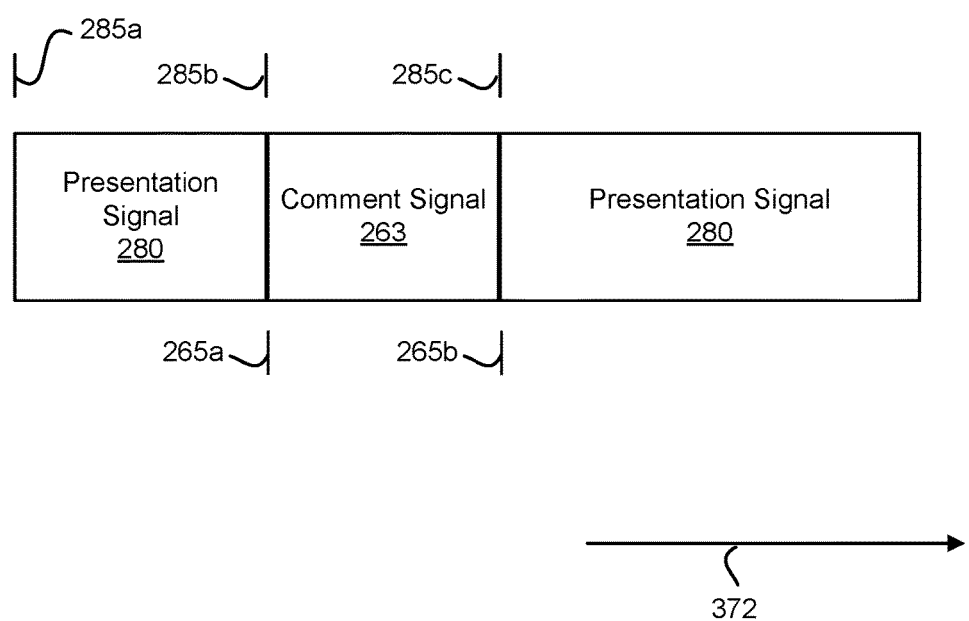
FIG. 5H is a schematic block diagram illustrating one alternate embodiment of presenting a source presentation and a comment response.

FIG. 5H is a schematic block diagram illustrating one alternate embodiment of presenting a source presentation 275 and a comment response 260 comprising a comment signal 263. In the depicted embodiment, the first comment time code 265a is set equal to the second presentation time code 285b and the third presentation time code 285c is set equal to the second comment time code 265b. As a result, the presentation signal 280 and the comment signal 263 are presented as a contiguous signal. In one embodiment, the source presentation 275 and the comment signal 263 are presented as a contiguous signal to one or more clients 115.

The embodiments synchronize the client time code 210 with the host time code 205. In addition, the embodiments record the recorded response 235 and/or comment response 260 to the presentation of the source presentation 275 at the client 115 using the host time code 205. As a result, the recorded responses 235 and comment responses 260 may be synchronized with the source presentation 275 when the source presentation is presented again. In addition, commands 250 and command time codes 255 may be recorded during the source presentation 275 and the source presentation 275 may later be presented modified by the commands 250 at the command time codes 255. As a result, recorded responses 235 and comments are synchronized to the source presentation 275.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   presenting a source presentation from a host at a client using a client time code;
   synchronizing, by use of a processor, the client time code with a host time code;

pausing presentation of the source presentation from the host in response to a pause command from the client;
recording the pause command and a first command time code synchronized to the host time code in a command record, wherein the command record is recorded on one of the host and the client and records each command and each command time code controlling presentation of the source presentation;
recording a response signal of a response to the presentation of the source presentation at the client and a first response time code in a recorded response, wherein the first response time code is synchronized to the host time code, and the response signal and first response time code are recorded to the host;
playing the source presentation from the host in response to a play command from the client;
recording the play command and a second command time code synchronized to the host time code in the command record;
presenting the source presentation from the host using presentation time codes, wherein the source presentation is presented from a first presentation time code;
in response to a second presentation time code being equal to the first command time code from the command record, performing the pause command from the command record at the host to pause the source presentation from the host;
presenting the response signal at the second presentation time code; and
in response to a third presentation time code being equal to the second command time code from the command record, performing the play command from the command record at the host to play the source presentation from the host, wherein the source presentation and the response signal are presented as a contiguous signal to one or more clients.

2. The method of claim 1, the method further comprising:
recording a comment response; and
concurrently presenting the comment response with the presentation of the source presentation.

3. The method of claim 1, wherein synchronizing the client time code with the host time code comprises:
communicating the host time code from the host to the client in response to satisfying a synchronization policy; and
updating the client time code with the host time code.

4. The method of claim 3, the method further comprising adjusting the synchronization policy.

5. The method of claim 3, wherein the synchronization policy is satisfied after a synchronization time interval.

6. The method of claim 1, wherein the source presentation is a video.

7. The method of claim 1, wherein the source presentation is an audio message.

8. The method of claim 1, wherein the source presentation is one or more of a live presentation, text, a document, and an illustration.

9. The method of claim 1, wherein the recorded response is a video.

10. The method of claim 1, wherein the recorded response is one or more of audio, text, a document, and an illustration.

11. The method of claim 1, wherein the source presentation is presented in a browser.

12. The method of claim 1, wherein the source presentation comprises language instruction.

13. An apparatus comprising:
a processor;
a memory storing code executable by the processor to perform:
presenting a source presentation from a host at a client using a client time code;
synchronizing the client time code with a host time code;
pausing presentation of the source presentation from the host in response to a pause command from the client;
recording the pause command and a first command time code synchronized to the host time code in a command record, wherein the command record is recorded on one of the host and the client and records each command and each command time code controlling presentation of the source presentation;
recording a response signal of a response to the presentation of the source presentation at the client and a first response time code in a recorded response, wherein the first response time code is synchronized to the host time code, and the response signal and first response time code are recorded to the host;
playing the source presentation from the host in response to a play command from the client;
recording the play command and a second command time code synchronized to the host time code in the command record;
presenting the source presentation from the host using presentation time codes, wherein the source presentation is presented from a first presentation time code;
in response to a second presentation time code being equal to the first command time code from the command record, performing the pause command from the command record at the host to pause the source presentation from the host;
presenting the response signal at the second presentation time code; and
in response to a third presentation time code being equal to the second command time code from the command record, performing the play command from the command record at the host to play the source presentation from the host, wherein the source presentation and the response signal are presented as a contiguous signal to one or more clients.

14. The apparatus of claim 13, the processor further performing:
recording a comment response; and
concurrently presenting the comment response with the presentation of the source presentation.

15. The apparatus of claim 13, wherein synchronizing the client time code with the host time code comprises:
communicating the host time code from the host to the client in response to satisfying a synchronization policy; and
updating the client time code with the host time code.

16. The apparatus of claim 13, wherein the recorded response is one or more of video, audio, text, a document, and an illustration.

17. A program product comprising a computer readable storage medium that stores code executable by a processor, the executable code comprising code to perform:
presenting a source presentation from a host at a client using a client time code;
synchronizing the client time code with a host time code;
pausing presentation of the source presentation from the host in response to a pause command from the client;
recording the pause command and a first command time code synchronized to the host time code in a command record, wherein the command record is recorded on one of the host and the client and records each command and each command time code controlling presentation of the source presentation;

recording a response signal of a response to the presentation of the source presentation at the client and a first response time code in a recorded response, wherein the first response time code is synchronized to the host time code, and the response signal and first response time code are recorded to the host;

playing the source presentation from the host in response to a play command from the client;

recording the play command and a second command time code synchronized to the host time code in the command record;

presenting the source presentation from the host using presentation time codes, wherein the source presentation is presented from a first presentation time code;

in response to a second presentation time code being equal to the first command time code from the command record, performing the pause command from the command record at the host to pause the source presentation from the host;

presenting the response signal at the second presentation time code; and in response to a third presentation time code being equal to the second command time code from the command record, performing the play command from the command record at the host to play the source presentation from the host, wherein the source presentation and the response signal are presented as a contiguous signal to one or more clients.

18. The program product of claim 17, the processor further performing:

recording a comment response; and concurrently presenting the comment response with the presentation of the source presentation.

19. The program of claim 17, wherein synchronizing the client time code with the host time code comprises:

communicating the host time code from the host to the client in response to satisfying a synchronization policy; and updating the client time code with the host time code.

* * * * *